(No Model.) 2 Sheets—Sheet 1.
C. STEVER.
VEHICLE BRAKE.
No. 545,548. Patented Sept. 3, 1895.
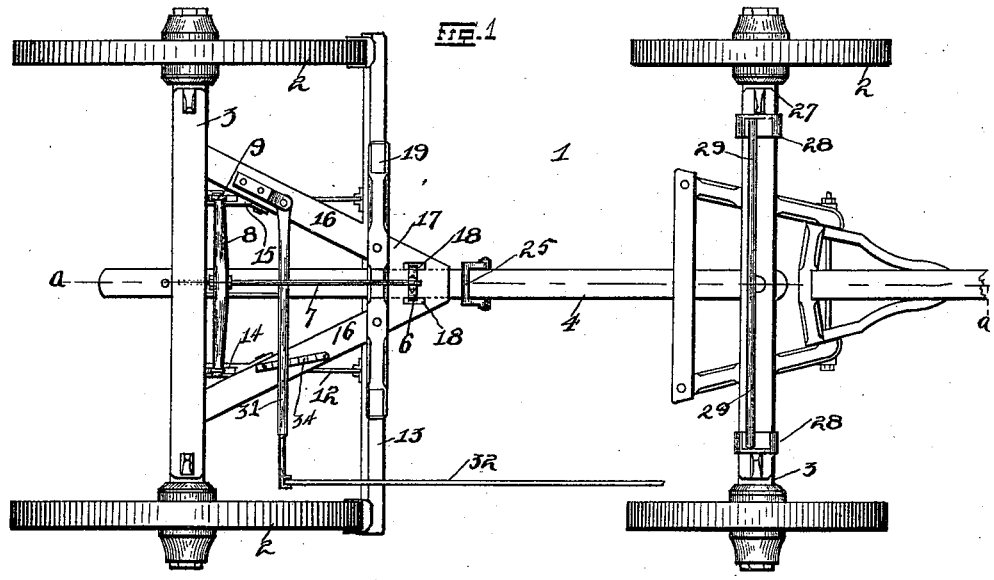
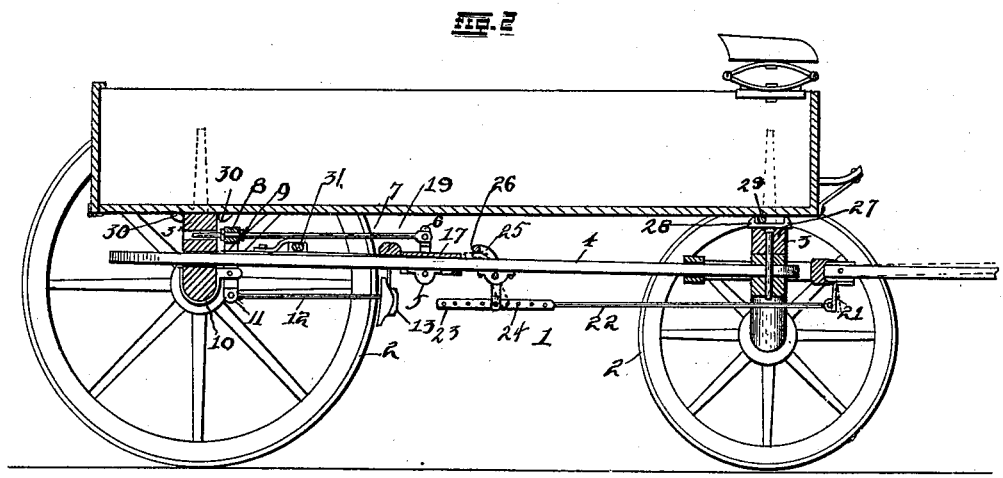
Witnesses
Fred Michels.
Geo. F. Lane.
Inventor
Charles Stever.
By Alfred A. Eicho Atty.

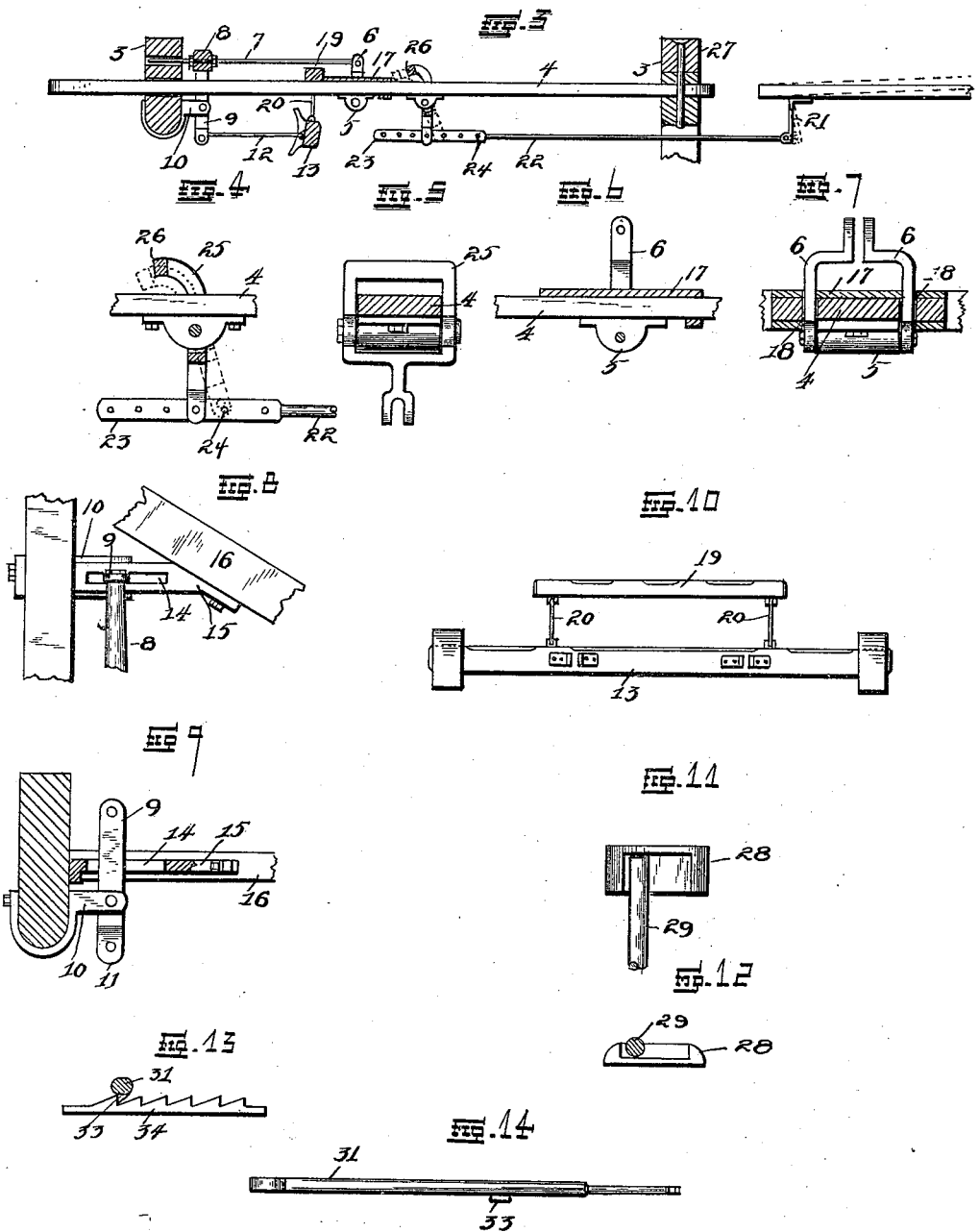

UNITED STATES PATENT OFFICE.

CHARLES STEVER, OF ST. LOUIS, MISSOURI, ASSIGNOR OF ONE-HALF TO THE JOHN A. NEUKUM & COMPANY, OF SAME PLACE.

VEHICLE-BRAKE.

SPECIFICATION forming part of Letters Patent No. 545,548, dated September 3, 1895.

Application filed April 5, 1895. Serial No. 544,550. (No model.)

*To all whom it may concern:*

Be it known that I, CHARLES STEVER, a resident of St. Louis and State of Missouri, have invented certain new and useful Improvements in Vehicle-Brakes, of which the following is a full, clear, and exact description, reference being had to the accompanying drawings, forming a part hereof.

My invention relates to improvements in vehicle-brakes, and it consists in the novel arrangement, construction, and combination of parts, as will be more fully hereinafter described, and set forth in the claims.

The object of my invention is to so construct a brake that it will lock or brake the wheels of a vehicle automatically, especially when a vehicle is descending an incline. The rear half of the gear of said vehicle has a tendency to move forward a slight distance and thereby operating the brake mechanism, and consequently locking said wheels by the pressure of the brake-shoes.

This device has been thoroughly tested and has proven to work practically, as the accompanying drawings have been made from a practical model.

Referring to the drawings, Figure 1 is a top plan view of my invention applied to a wagon. Fig. 2 is a vertical sectional view of the same taken on the line *a a* of Fig. 1. Fig. 3 is a vertical view similar as Fig. 2, with the wheels removed therefrom. Fig. 4 is a sectional side elevation of a casting which is used when backing. Fig. 5 is a view of locking mechanism. Fig. 6 is a sectional side elevation of the casting whereby the brake-shoes are operated. Fig. 7 is a face view of the same. Fig. 8 is a top plan view of a portion of the axle and brace with the guide-casting secured thereto. Fig. 9 is a vertical sectional view of the same with the brake-lever shown therein. Fig. 10 is a face or front view of the brake-beam and supporting-bar with the brake-shoes secured thereto. Fig. 11 is a top plan view of a roller-guide with a portion of a roller located therein. Fig. 12 is a side view of the same with the roller in section. Fig. 13 is a side view of a toothed bar for forming part of my device when used by a hand-lever. Fig. 14 is a side view of the hand-lever.

In the drawings, 1 indicates a vehicle of the ordinary construction, having wheels 2, axles 3, and a coupling pole 4.

To the coupling-pole 4 and about its center is secured a block or casting 5, and to said casting 5 is pivotally secured levers 6. The levers 6 are held to said casting 5 by means of a pin or bolt at its lower end. At its upper end and between the two halves is pivotally secured a rod 7. The opposite end of said rod 7 is secured to a cross-bar 8. Said rod 7 is provided with screw-threads, so that it may be adjusted to the cross-bar 8. The cross-bar 8 is secured at both ends to a vertical lever 9, held in a U-shaped bearing 10, secured to the axle. The lever 9 is provided at its lower end with two ears 11, in which a rod 12 is held, said rod 12 connecting the lever 9 with the brake-beam 13. The lever 9 is guided in a slot 14, formed in the guide-plate 15. The guide-plate 15 is secured to the axle 3 and to the angular cross-piece 16. The cross-pieces 16 are provided at their meeting ends with a cover-plate 17. Said plate 17 is provided with two slots 18, and one located on each side of the coupling-pole 4. Said slots 18 are used for the purpose of allowing the lever 6 to operate therein.

In order to hold up the brake-beam 13, I place upon the strips 16 a bar 19, and from said bar 19 and secured thereto are rods 20, connected to the brake-beam 13, thereby supporting the same.

When it is desired to back the vehicle on which this brake is applied, I provide the tongue of said vehicle with a strip of spring material 21, and to said spring 21 I secure a rod 22, which has its one end flattened, (indicated by the numeral 23,) and said flattened portion is provided with holes or perforations 24. Said perforations are added for the purpose of adjusting the rod 22 to correspond with the length of the vehicle. The rod 21 operates the casting 25. When the vehicle is being backed, the tongue has a tendency to be uplifted, thereby pulling upon the rod 22 and giving the casting 25 the position as shown in dotted lines in Figs. 2 and 3. The end 26 is then in contact with the cover-plate 17, and thereby preventing the rear gear from running forward and operating the brake mechanism.

In order to allow the rear gear to freely operate when a body is placed thereon, I place upon the front bolster 27 guides 28, in which a roller 29 is placed. The roller 29 is of sufficient diameter so as to extend a slight distance above the guide 28. When the rear gear moves forward, the body rolls forward on the roller 29, thereby taking off the strain and weight caused by the said body. In order to prevent said body from becoming disconnected from the rear bolster, I provide the bottom of said body with two lugs 30, one located on each side of the bolster.

The operation of my invention is as follows: When the wagon is descending an incline, the rear portion of the gearing has a tendency to run forward, and by so doing the cover-plate 17 presses against the levers 6, pulling upon the rod 7, cross-bar 8, and top of the levers 9, and at the same time pulling upon the rod 12, which is secured to the brake-beam, and firmly locking the wheels of said vehicle. When it is desired to back said vehicle, the tongue has a tendency to be uplifted, thereby pulling upon the rod 22 and bringing the end 26 of the casting 25 against the cover-plate 17, thus holding said gear from operating the brake mechanism.

In case the brake mechanism should meet with an accident and will not operate automatically, I use the hand-lever 31. (See Figs. 1, 13, and 14.) This is operated by a rod 32, secured to the ordinary hand-brake of any style. The lever 31 has a wedge-shaped projection 33, which comes in contact with the rack-bar 34, which is secured to the gearing. This device can be operated independently from the other portion of the brake.

Having fully described my invention, what I claim is—

1. In an improved automatic vehicle brake, having its braking mechanism operated by the coupling, a casting mounted in bearings upon said coupling, an arm or rod connecting said casting to an arm secured to the tongue, which operates said casting, and bringing it in contact with the plates secured to the rear axle braces, for the purpose of keeping the brake unlocked while backing, substantially as shown and described.

2. In an improved automatic vehicle brake, operated by a cover plate 17, forming part of the rear gearing levers 6 operating in slots, formed in said cover plate, a rod 7 connecting said levers to a cross bar 8, and adjustably secured thereto, said cross bar 8 secured at each end to vertical levers 9 having their bearings in U shaped castings, secured to the axle rods 12 connecting said levers to the brake beam, for the purpose of locking the brake, a casting secured to the coupling pole and operated by a rod secured to the tongue for the purpose of preventing said brake from locking when backing, a roller located in guides secured on the front bolster, so as to allow the rolling of the body when said brake is in operation, substantially as shown and described.

In testimony whereof I affix my signature in the presence of two witnesses.

CHARLES STEVER.

Witnesses:
ALFRED A. EICKS,
GEO. F. LANE.